United States Patent Office 3,219,598
Patented Nov. 23, 1965

3,219,598
RIGID POLYETHER TYPE POLYURETHANE
CELLULAR PLASTIC MATERIALS
Wilbur L. Bressler, Lake Jackson, and Billy D. Davis,
Clute, Tex., assignors to The Dow Chemical Company,
Midland, Mich., a corporation of Delaware
No Drawing. Filed July 7, 1961, Ser. No. 122,397
5 Claims. (Cl. 260—2.5)

This invention relates to polyurethane cellular plastic materials of the polyether type and to methods for making the same.

Although various plastic foams that possess certain desirable physical properties and are well suited for many applications are well known to the art, many of them exhibit a lack of dimensional stability and thus, upon standing, distort from their original fabricated form to such a degree that they are unfit for certain applications. Under conditions of high humidity, this lack of dimensional stability is even more pronounced. When a foam lacking dimensional stability shrinks, the density of the foam is increased and the cellular plastic material will pull away from its enclosing surfaces. The shape of articles made from the plastic foams will also be objectionably altered.

It is an object of the present invention to provide rigid polyether type polyurethane cellular plastic materials having excellent dimensional stability as characterized by their unusual resistance to distortion upon heating and/or wetting. Another object is to provide a process for making rigid polyether type polyurethane cellular plastic materials having the above properties. Further objects will appear from the detailed description of this invention which follows.

The above objects are accomplished by the process of this invention in which an unfoamed fluid polyether type polyurethane product containing isocyanato radicals and formed by the reaction between an aromatic diisocyanate, that is, wherein each NCO group is directly attached to an aromatic ring, and a compound selected from the group consisting of (1) the product produced by the reaction of sucrose, glycerol, and propylene oxide and (2) tris(hydroxypropyl)glycerol[1,2,3 - tris - (2 - hydroxypropoxy)propane], is foamed by mixing it with a blowing agent or a blowing agent and water, a catalyst and an amount of the sucrose-glycerol-propylene oxide product.

The product produced by the reaction of sucrose, glycerine, and propylene oxide will hereinafter be called "polyol" and its use as a cross-linking agent and its preparation are fully described and claimed in the copending application by W. L. Bressler and C. F. Ward, filed January 29, 1959, Serial Number 789,784, now issued as U.S. Patent 2,990,376. The unfoamed fluid polyether type polyurethane product comprising the reaction product of the polyol and a diisocyanate of the type described above will hereinafter be called "polyol semiprepolymer." The unfoamed fluid polyether type polyurethane product comprising the reaction product of tris(hydroxypropyl)glycerol and a dissocyanate of the type described above will hereinafter be called "THPG semiprepolymer."

The preparation of foams according to this invention is accomplished by incorporating with the polyol semiprepolymer or with the THPG semiprepolymer, a mixture comprising a blowing agent or a blowing agent and water, a catalyst optionally but preferably a dispersing agent, and the polyol, and then placing the reaction mixture in the mold or other position where the foam is to be foamed. The mass expands during this period and tends to fill the space in which it is confined. In a relatively short time, the reaction is completed and the foam cures at room temperature to give a firm polyether type polyurethane cellular plastic material. Though the foam will cure upon standing at room temperature, it can also be oven-cured in order to decrease the cure time.

Rigid foams, in general, can be prepared by any of the three methods known to the art. These methods are termed broadly as the "prepolymer methods," the "semiprepolymer method" and the "one-shot method." In the prepolymer method, the resin (polyhydroxy compound) and the diisocyanate are reacted with each other in such proportions as to produce a liquid product which requires only the addition of catalyst and water or blowing agent to give a complete foam. The semiprepolymer method is distinguished from the prepolymer method in that the semiprepolymer requires additional resin plus catalyst and water or blowing agent to produce a foam. The ingredients are not prereacted in the one-shot method, but are all mixed at one time so that polymerization and foaming take place simultaneously.

While any of the three above methods may be employed to produce a rigid foam with the ingredients disclosed in the present invention, the semiprepolymer method is the one preferred in that the foam produced thereby has the best dimensional stability characteristics.

Both the polyol semipepolymer and the THPG semiprepolymer preferably have a viscosity within the range of from about 10 stokes to about 1000 stokes at 24° C. and an NCO content of from about 15 percent to 35 percent. At the above viscosities, the gas that is evolved during the foaming operation does not escape from the reaction mass to any great extent and a cellular mass is formed. If the viscosity is too low, the gas merely bubbles out through the reaction mass and escapes, while at too high a viscosity it is difficult to obtain satisfactory mixing and non-uniform cellular products of higher density result.

The polyol semiprepolymer is prepared by the reaction between a diisocyanate of the type heretofore described and the polyol. The amount of diisocyanate employed will depend upon the equivalents of hydroxyl present in the polyol and at least greater than 1 equivalent of NCO must be employed to 1 equivalent of OH. Preferably, the ratio of NCO to OH is about 4 to 1 but the desirable polyol semiprepolymer is produced when the ratio is in the range of from about 2 to 6 equivalents of NCO per equivalent of OH. While it is not detrimental to exceed the 6 to 1 ratio, the result is such that further addition of NCO merely dilutes the reaction mass and thus adds to the production expense. When 1 or less than 1 equivalent of NCO is employed, the polyol prepolymer does not have sufficient NCO groups available for the foaming reaction, and an inferior foam results. Further, the desired polyol semiprepolymer is one that has been prepared by adding the polyol to the dissocyanate at such a rate as to allow the temperature of the reaction mass to be maintained at about 55° to 100° C. and preferably at about 60°.

The THPG semiprepolymer is prepared by the reaction between a diisocyanate of the type heretofore described and tris(hydroxypropyl)glycerol. The ratios of NCO to OH and other conditions preferred in its preparation are the same as those described above for preparing the polyol semiprepolymer.

The term "semiprepolymer," when used alone hereinafter, will mean either polyol semiprepolymer or THPG semiprepolymer.

As stated above, additional resin (polyhydroxy compound) is required for the preparation of a foam from a semiprepolymer. If this additional resin is selected from those resins known to the art which are commonly employed as cross-linking agents, rigid foams can be produced but they will not have the excellent dimensional stability which is characteristic of the foams produced according to the present invention. By the expression "excellent dimensional stability" as used thereinafer, is means that the foams will not distort greater than ±10 volume percent upon being subjected to the usual heat and/or moisture resistance tests. The excellent dimensional stability is characteristic of the foams of the present invention due to the use of the polyol as a cross-linking agent and, of course, this polyol is the preferred cross-linking agent which is added during the foaming reaction.

The amount of polyol employed as a cross-linking agent will depend upon the number of unreacted isocyanato groups in the semiprepolymer. By adding an excess of di-N-butylamine to a sample of the semiprepolymer and back-titrating the excess amine with hydrochloric acid, the number of unreacted isocyanato groups in the semiprepolymer can be readily ascertained. However, individual batch analysis of the semiprepolymer can often be dispensed with, since by employing our preferred procedure and using definite proportions of ingredients, a semiprepolymer which has a reasonably definite and consistent amount of unreacted isocyanate can be prepared. The equivalents of OH in the polyol used for cross-linking can be greater than, equal to, or less than the equivalents of NCO in the polyol semiprepolymer as long as the greater or lesser equivalents do not differ from the equivalents of NCO by more than ±40 percent. For example, if the NCO equivalency is equal to 1, then the OH equivalents can be as high as 1.4, or as low as 0.6 and, of course, any amount in between 1.4 and 0.6.

Though we prefer to employ the polyol as the cross-linking agent and as a source of OH, it is possible to supply part of the OH by water as long as at least half of the OH equivalent is supplied by the polyol. For example, if the NCO equivalency is 1 and a total OH equivalency of 0.8 is to be used, the 0.8 equivalent of OH can be supplied by 0.4 equivalent of polyol and 0.4 equivalent of water.

When the polyol alone is used as a source of OH in the foaming reaction, it is essential that a blowing agent which can provide gas for the expansion of the foam be employed. This blowing agent can be any known blowing agent for urethanes and is preferably from that group of liquids which vaporize at or below the temperature of the foaming mass and we prefer to employ trichlorofluoromethane in the range of from about 12 percent to about 20 percent by weight, of the total charge. However, when water is used along with the polyol, the amount of blowing agent can be reduced accordingly since the water, in reacting, liberates carbon dioxide.

Any known catalyst for the reaction of isocyanates with hydroxy compounds can be used in the present process. Preferred catalysts include various tin compounds, such as dibutyl tin laurate, stannous oleate and the like, metal salts of acetylacetone, such as ferric acetylacetonate, and tertiary amines. The amines that may be used as catalysts in the process of this invention are those tertiary amines commonly employed as catalysts for the preparation of urethane foams. Representative compounds include triethylenediamine, diethylethanolamine, dimethylethanolamine, N-methylmorpholine, pyridine, and trimethylamine. From about 0.2 percent to about 0.6 percent by weight, based on total charge, of the tertiary amine is ordinarily used. Other catalysts are generally used in amounts of about 0.2 to 2 percent. When small amounts of the catalysts are employed, the foaming reaction proceeds very slowly and the foam prepared thereby is difficult to cure at room temperature. When excessive amounts of the catalysts are employed, the foam time becomes so short that it is difficult to stir the reactants and get the mass into a mold before the foaming gets out of control.

A dispersing agent, or surfactant, although not essential, improves the mixing of the reactants and influences the cell structure of the foam. Any of the dispersing agents useful in making urethane foams are useful in the present process. Typical such agents are described, for instance, in the bulletin "Rigid Urethane Foams-II Chemistry and Formulation" by C. M. Barringer, HR–26, Elastomer Chemicals Dept., E. I. du Pont Co., April 1958. We prefer to employ Silicone XL–520, which is the trade name for an organo-silicone polymer produced in accordance with the disclosure in U.S. Patent No. 2,834,748 or DC–199, a similar silicone fluid both sold commercially for use in polyurethane foams, in the range of from about 0.1 percent to about 0.5 percent by weight, based on total charge. Other preferred surfactants include the hydrophobic polyoxyalkylene compounds disclosed in the patent application of Prescott and Bressler, Serial Number 33,379, filed June 2, 1960, now abandoned.

The foams produced according to the present invention have a dimensional change of less than 10 percent upon humidity-aging and will have at least 80 percent closed cells. The tensile strength is in the range of from about 20 to about 200 p.s.i. and the compression yield is in the range of from about 40 to about 250 p.s.i. The compression yield and tensile strength must necessarily depend on the reactants employed. This is shown to a greater extent in the examples below, wherein by varying the amount of blowing agent, the physical properties of the foams are varied.

The following specific examples will better illustrate the practice of the present invention; however, the invention is not intended to be limited to these examples.

EXAMPLE 1

Polyol preparation

Into a reaction vessel equipped with a means for stirring, temperature control, and maintaining a methane atmosphere were placed 17.7 pounds of refined beet sugar, 11.5 pounds of glycerol, 210 grams of triethylamine catalyst, and 210 grams of water. The mixture was preheated to 100° C., after which 45 lbs. of propylene oxide was added over a 12-hour period. During this period the pressure was maintained by the propylene oxide at about 40–50 p.s.i.g. and the temperature was maintained at about 100° C. Upon completion of the propylene oxide addition, the reaction mixture was digested for 2 hours at approximately 100° C. At the end of the digestion period, the pressure in the vessel was reduced to 5 mm. absolute, and maintained thereat for 15 minutes while maintaining the temperature at about 100° C. The product had the following properties:

Viscosity _____ 179.5 stokes at 210° F.
APHA color _____ 90.

EXAMPLE 2

Preparation of polyol semiprepolymer

Into a reaction vessel equipped with a means for heating, temperature control and maintaining a nitrogen atmosphere were placed 1723 grams of toluene diisocyanate (tolylene diisocyanate). The toluene diisocyanate was then preheated to 60° C., after which 450 grams of polyol, prepared as in Example 1, were added over a 90-minute period. During this period, the temperature of the reaction vessel was maintained between 60° and 80° C. The polyol semiprepolymer thus produced had a viscosity at 24° C. of 48 stokes and an NCO content of 28.5 percent.

EXAMPLE 3

Preparation of THPG semiprepolymer

Into a reaction vessel equipped with a means for heating, temperature control and maintaining a nitrogen atmosphere were placed 9750 grams of toluene diisocyanate. The toluene diisocyanate was then preheated to 60° C., after which 2430 grams of 1,2,3-tris(hydroxypropyl)glycerol were added over a 45-minute period. During this period, the temperature of the reaction vessel was maintained between 55° and 60° C. The THPG semiprepolymer thus produced had a viscosity at 24° C. of 52 stokes and an NCO content of 27.5 percent.

EXAMPLE 4

*Preparation of THPG semiprepolymer*

Into a reaction vessel equipped with a means for heating, temperature control and maintaining a nitrogen atmosphere were placed 572 pounds of toluene diisocyanate. The toluene diisocyanate was then preheated to 60° C., after which 150 pounds of tris(hydroxypropyl) glycerol were added over a 2-hour period. During this period, the temperature of the reaction vessel was maintained between 50° and 60° C. The THPG semiprepolymer thus produced had a viscosity at 24° C. of 160 stokes and an NCO content of 26.2 percent.

EXAMPLE 5

*Foam preparation from polyol semiprepolymer*

Component A: 147.5 grams of the polyol semiprepolymer prepared as in Example 2.
Component B:
    91.0 grams of the polyol prepared as in Example 1
    0.6 grams of Silicone XL–520
    0.7 grams of triethylenediamine
    28.7 grams of trichlorofluoromethane The components, A and B, both at room temperature, were thoroughly mixed for 20 seconds and immediately poured into a rectangular mold having a width of approximately 3 inches, a length of approximately 12 inches, and a height of 18 inches. The mass expanded over a time period of 86 seconds from an initial height of approximately 1 inch to a final height of 16 inches.

Analysis of the foam gave the following:

80 percent closed cells
    16 percent open cells
    4 percent wall
    Density=2.5 lbs./ft.$^3$ The foam swelled 6 percent while being subjected to 16 hours in the humidity-aging chamber. The humidity-aging chamber maintains a humidity of 98 percent to 100 percent at a temperature of 158° F.±2°.

EXAMPLE 6

*Foam preparation from polyol semiprepolymer*

Component A: 132 grams of the polyol semiprepolymer prepared as in Example 2.
Component B:
    91.0 grams of the polyol prepared as in Example 1
    0.7 grams of triethylenediamine
    0.6 grams of Silicone XL–520
    27.0 grams of trichlorofluoromethane The components, A and B, at room temperature, were thoroughly mixed for 20 seconds and immediately poured into a rectangular mold having a width of approximately 3 inches, a length of approximately 12 inches, and a height of 18 inches. The mass expanded over a time period of 133 seconds.

Analysis of the foam gave the following:

80 percent closed cells
    16 percent open cells
    4 percent cell wall
    Density=2.5 lbs./ft.$^3$ The foam swelled 8 percent while being subjected to 16 hours in the humidity-aging chamber.

EXAMPLE 7

*Foam preparation from THPG semiprepolymer*

Component A:
    320 grams of THPG semiprepolymer prepared as in Example 3
    80 grams of trichlorofluoromethane
Component B:
    196.0 grams of polyol prepared as in Example 1
    1.2 grams of XL–520
    1.8 grams of triethylenediamine The two components, A and B, at room temperature, were thoroughly mixed for 30 seconds and immediately poured into a rectangular mold having a width of approximately 8 inches, a length of approximately 12 inches, and a height of 18 inches. After oven-curing for 1 hour at 75° C., the foam was placed in the humidity-aging chamber for 16 hours.

Swelling=8 percent
    Density=1.9 lbs./ft.$^3$

EXAMPLES 8–17

The foams in the following table were prepared as in Example 7 using THPG semiprepolymer prepared in Examples 3 and 4. It is pointed out that water was used in Examples 9 through 13.

| Example No. | Percent Blowing Agent | Equivalents | | NCO:OH | Compression | | | Percent Dimensional Stability Swelling |
| --- | --- | --- | --- | --- | --- | --- | --- | --- |
| | | H$_2$O | Polyol | | Density, lb./ft.$^3$ | Yield, p.s.i. | Tensile, p.s.i. | |
| 8 | 15.5 | 0 | 1.0 | 1:1 | 2.13 | | | 5 |
| 9 | 9 | .2 | .8 | 1.1:1 | 1.88 | | | 5 |
| 10 | 9 | .2 | .8 | 1.1:1 | 1.97 | | | 6 |
| 11 | 12 | .1 | .9 | 1:9 | 2.39 | | | 7 |
| 12 | 9 | .2 | .8 | 1:1 | 2.06 | | | 3 |
| 13 | 12 | .1 | .9 | 1.1:1 | 1.97 | | | 6 |
| 14 | 6 | 0 | 1.0 | 1:1 | 5.96 | 221 | | 5 |
| 15 | 8 | 0 | 1.0 | 1:1 | 4.07 | 127 | | 6 |
| 16 | 20 | 0 | 1.0 | 1:1 | 2.05 | 41 | 60 | 6 |
| 17 | 10 | 0 | 1.0 | 1:1 | 3.72 | 117 | 143 | |

EXAMPLE 18

*Foam preparation from polyol semiprepolymer*

Component A:
    306 grams of polyol semiprepolymer prepared in Example 2
    80 grams of trichlorofluoromethane
Component B:
    196.0 grams of polyol prepared as in Example 1
    1.9 grams of triethylenediamine
    1.2 grams of Silicone XL–520

The components, A and B, at room temperature, were thoroughly mixed for 20 seconds and immediately poured into a rectangular mold having a width of approximately 3 inches, a length of approximately 12 inches, and a height of 18 inches. The mass expanded over a time period of 131 seconds. After oven-curing for 1 hour at 75° C., the foam was placed in the humidity-aging chamber for 16 hours.

Swelling=4 percent
    Density=2 lbs./ft.$^3$

EXAMPLE 19

A urethane foam was made without any surfactant or dispersing agent as follows:

Component A: 153 grams of THPG semiprepolymer made as described in Example 3

Component B:
    94.2 grams of polyol made as described in Example 1
    35.8 grams $CFCl_3$
    1.2 grams of stannous oleate Components A and B were thoroughly mixed at room temperature for 20 seconds and then poured into a mold. The resulting foam had the following properties:

88.3 percent closed cells
    7.5 percent open cells
    4.2 percent cell wall
    Density=2.68 lbs./ft.$_3$ It swelled 8 percent during 24 hours in the humidity-aging chamber.

EXAMPLE 20

To a semiprepolymer made as described in Example 3 was added 0.5 percent by weight of a water-soluble polydimethylsiloxane-polyoxyalkylene glycol surfactant. It was then used to make a foam as described in Example 5 by reaction with polyol containing 0.5 percent of the same surfactant, 12.4 percent of $CFCl_3$ and 2.4 percent of $CF_2Cl_2$. The foam had a density of 2.1 lbs. per cubic ft. and swelled only 5 percent in 24 hours in the humidity-aging chamber.

EXAMPLES 21–23

A THPG semiprepolymer containing 31 percent NCO and prepared substantially as described in Examples 3 and 4 was reacted with polyol containing 15 percent of $CFCl_3$, 0.35 percent of the surfactant used in Example 20 and 0.35 percent of a metal acetylacetonate catalyst. The metal of the catalyst and the density and percent swell of the foam after 24 hours in the humidity-aging chamber were as follows:

| Example No. | Metal Catalyst | Density, lb./ft.$^3$ | Percent Swell |
|---|---|---|---|
| 21 | Copper | 1.9 | 0 |
| 22 | Iron | 1.9 | 8 |
| 23 | Uranium | 2.1 | 9 |

EXAMPLE 24

A THPG semiprepolymer similar to that used in Examples 21–23 and containing 30.9 percent NCO was reacted with polyol containing as a surfactant 0.5 percent of polyoxypropylene glycol having an average molecular weight of 4000, 14.5 percent of $CFCl_3$ and 0.25 percent of ferric acetylacetonate to produce a foam having a density of 2.0 lbs. per cubic ft. and which swelled 7 percent during 24 hours in the humidity-aging chamber.

As will be apparent to those skilled in the art, the advantages of the present invention are retained to some extent when the THPG and hydroxypropylsucrose are replaced in part with conventional polyether polyhydroxy compounds, so long as such replacements are to a minor extent, i.e., less than about 50 percent based on the hydroxy content.

This application is a continuation-in-part of our copending application Serial No. 789,783, filed January 29, 1959, now abandoned.

We claim:

1. In the process of making a rigid polyether-type polyurethane cellular plastic material by the reaction of an aromatic diisocyanate with a polyhydroxy polyether with simultaneous foaming by the action of a blowing agent, the improvement of using as the polyhydroxy polyether a composition comprising a major proportion of a polyhydroxy compound selected from the group consisting of 1,2,3 - tris(2 - hydroxypropyl)glycerol and octakis(2-hydroxypropyl)sucrose and mixtures thereof.

2. The process of claim 1 wherein a semiprepolymer is made by the reaction of a stoichiometric excess of the diisocyanate and a portion of the polyhydroxy polyether and then the semiprepolymer is converted to the cellular plastic material by reaction with the remainder of the polyhydroxy polyether in the presence of a catalyst and a blowing agent.

3. The cellular plastic material made by the process of claim 1 and further characterized in that it swells less than 10 percent when submitted to an ambient humidity of 98 percent and a temperature of 158° F. for a period of 24 hours.

4. The process of claim 1 wherein the reaction of the diisocyanate and the polyether is effected in the presence of a dispersing agent effective to improve the mixing of the reactants and the cell structure of the foam.

5. The process of claim 4 wherein the dispersing agent is an organo-silicone polymer.

References Cited by the Examiner

UNITED STATES PATENTS

| | | | |
|---|---|---|---|
| 2,902,478 | 9/1959 | Anderson | 260—615 |
| 2,915,496 | 12/1959 | Swart et al. | 260—77.5 XR |
| 2,927,918 | 3/1960 | Anderson | 260—77.5 |
| 2,990,376 | 6/1961 | Bressler et al. | 260—2.5 |
| 3,102,875 | 9/1963 | Heiss | 260—2.5 |
| 3,112,281 | 11/1963 | Gromacki et al. | 260—2.5 |

OTHER REFERENCES

Dow Chemical Literature, "Hyprose SP80," March 1957 (6 pages).

LEON J. BERCOVITZ, *Primary Examiner.*

DONALD E. CZAJA, JOSEPH L. SCHOFER,
                                                         *Examiners.*